(12) United States Patent
Schleppe et al.

(10) Patent No.: US 9,766,343 B2
(45) Date of Patent: Sep. 19, 2017

(54) SYSTEM AND METHOD FOR DETERMINING LOCATION OF AN INTERFERING SIGNAL SOURCE

(71) Applicant: NovAtel Inc., Calgary (CA)

(72) Inventors: John B. Schleppe, Calgary (CA); Patrick C. Fenton, Calgary (CA)

(73) Assignee: NovAtel Inc., Calgary, Alberta (CA)

( * ) Notice: Subject to any disclaimer, the term of this patent is extended or adjusted under 35 U.S.C. 154(b) by 594 days.

(21) Appl. No.: 14/309,104

(22) Filed: Jun. 19, 2014

(65) Prior Publication Data
US 2015/0369922 A1 Dec. 24, 2015

(51) Int. Cl.
*G01S 19/21* (2010.01)
*G01S 5/06* (2006.01)
*G01S 19/03* (2010.01)

(52) U.S. Cl.
CPC ............ *G01S 19/21* (2013.01); *G01S 19/215* (2013.01); *G01S 5/06* (2013.01); *G01S 19/03* (2013.01)

(58) Field of Classification Search
CPC ........ G01S 19/215; G01S 19/03; G01S 19/21; G01S 5/06
USPC .......................... 342/357.4, 357.59; 701/474
See application file for complete search history.

(56) References Cited

U.S. PATENT DOCUMENTS

| | | | |
|---|---|---|---|
| 5,008,679 A * | 4/1991 | Effland | G01S 5/06 342/353 |
| 5,936,571 A | 8/1999 | Desjardins | |
| 6,882,310 B1 * | 4/2005 | Drentea | G01S 19/215 342/357.59 |
| 7,512,492 B2 | 3/2009 | Irvin et al. | |
| 8,085,201 B2 | 12/2011 | Ladd et al. | |
| 8,138,975 B2 | 3/2012 | Bull et al. | |
| 8,446,310 B2 | 5/2013 | Law et al. | |
| 8,558,738 B2 | 10/2013 | Ladd et al. | |

(Continued)

FOREIGN PATENT DOCUMENTS

| | | |
|---|---|---|
| WO | WO 97/11383 A | 3/1997 |
| WO | WO 01/65271 A1 | 9/2001 |

(Continued)

OTHER PUBLICATIONS

Bhatti J A et al., "Development and Demonstration of a TDOA-Based GNSS Interference Signal Localization System," PLANS 2012—Proceedings of IEEE/ION Plans 2012, The Institute of Navigation, 8551 Rixlew Lane Suite 360 Manassas, VA 20109, Apr. 26, 2012, pp. 455-469.

(Continued)

*Primary Examiner* — Chuong P Nguyen
(74) *Attorney, Agent, or Firm* — Cesari and McKenna, LLP

(57) ABSTRACT

A system and method to determine the location of an interfering signal source within a few meters. Three or more networked GNSS receivers are located at known locations and used to simultaneously collect and time-stamp data samples at L1 and L2. The data samples are passed over the network to a server which identifies samples associated with an interfering signal, cross correlates associated samples from pairs of receivers, and applies a discriminator function to significantly improve the accuracy of a computed time difference of arrival (TDOA) for the interfering signal, thereby significantly improving the accuracy of the location determination.

20 Claims, 6 Drawing Sheets

(56) References Cited

U.S. PATENT DOCUMENTS

| | | | | |
|---|---|---|---|---|
| 8,587,478 | B1* | 11/2013 | Kang | G01S 19/21 342/387 |
| 8,743,725 | B2* | 6/2014 | Wigren | G01S 5/06 370/252 |
| 9,063,215 | B2* | 6/2015 | Perthold | G01S 5/021 |
| 9,172,514 | B2* | 10/2015 | Wigren | G01S 5/06 |
| 2003/0112905 | A1* | 6/2003 | Heinzl | G01S 19/21 375/350 |
| 2005/0285781 | A1* | 12/2005 | Park | G01S 19/21 342/357.48 |
| 2012/0062426 | A1* | 3/2012 | Tocker | G01S 19/22 342/378 |
| 2014/0218240 | A1* | 8/2014 | Kpodzo | G01S 5/0215 342/450 |
| 2015/0035699 | A1* | 2/2015 | Yun | G01S 5/0036 342/357.29 |

FOREIGN PATENT DOCUMENTS

| | | |
|---|---|---|
| WO | WO 2011/160697 A1 | 12/2011 |
| WO | WO 2014/084512 A1 | 6/2014 |

OTHER PUBLICATIONS

Oscar Isoz et al, "Development of a deployable low cost interference detection and localization system for the GNSS L1/E1 band" Satellite Navigation Technologies and European Workshop on GNSS Signals and Signal Processing (Navitec), 2010 5$^{th}$ ESA Workshop on, IEEE, Dec. 8, 2010, pp. 1-4.

Lindstrom Jonas et al., "GNSS Interference Detection and Localization using a Network of Low Cost Front-End Modules" GNSS 2007—Proceedings of the 20$^{th}$ International Technical Meeting of the Satellite Division of the Institute of Navigation, 8551 Rixlew Lane Suite 360 Manassas, VA 20109, Sep. 28, 2007, pp. 1165-1172.

Konstantin Gromov et al, "GIDL: Generalized Interference Detection and Localization System" GPS 2000—Proceedings of the 13$^{th}$ International Technical Meeting of the Satellite Division of the Institute of Navigation, 8551 Rixlew Lane Suite 360 Manassas, VA 20109, Sep. 22, 2000, pp. 447-457.

European Search Report mailed Dec. 27, 2015 for European Patent Application No. 15172301.2-1812 for Novatel, Inc., 9 pages.

* cited by examiner

SYSTEM AND METHOD FOR DETERMINING LOCATION OF AN INTERFERING SIGNAL SOURCE

BACKGROUND OF THE INVENTION

Field of the Invention

The invention relates generally to a system and method for determining a location of an interfering signal source.

Background Information

Signals which interfere with GNSS receivers, whether unintentional or intentional, may cause significant degradation in performance of such receivers and, in some cases, may represent a serious threat. Some interfering signal sources are simply electronic devices which, through poor design or malfunction, are accidentally transmitting on GNSS frequencies of interest (e.g., L1 or L2). Other interfering signal sources are specifically designed to cause interference. For example, while illegal to sell, possess or use in the US, Canada and UK, handheld GNSS "personal privacy devices" (i.e., jammers) are widely available and inexpensive. Such jammers typically operate at power levels of 200-300 milliwatts and claim to be effective for a range of 5-10 meters. However, such jammers may adversely affect GNSS receivers at a range of more than 1 kilometer.

Determining the position of a jammer in real-time or near real-time is a challenging problem. A jammer's signal is typically wideband in nature and resembles a pulse or chirp with a period that is likely not known by a party (e.g., law enforcement) attempting to determine the location of the jammer. In addition, although a jammer's operating frequency band may be known or ascertained, its precise operating frequency is likely not known. Also, a jammer may vary its operating frequency over time further complicating the problem of determining its location.

SUMMARY OF THE INVENTION

In brief summary, the present invention provides a system and method for determining a location of a GNSS jammer with accuracy on the order of a few meters. The system includes three or more augmented GNSS receivers which are placed at known locations separated from one other by minimum distances. The receivers are networked with a server or other equipment which is capable of performing the necessary processing on data samples collected by the receivers.

Following initialization, each receiver simultaneously operates to collect raw I/Q data at GNSS frequencies of interest at a rate on the order of 5 megasamples per second. The collected data samples are filtered and downconverted to intermediate frequency (IF), digitized, and time tagged with the current time of the receiver which collected the samples. The collected samples may be stored locally by the receiver before they are transmitted over the network to the server.

The server initially processes the samples from a given one of the receivers in an effort to identify an interfering signal (or signals) whose power level exceeds a threshold that is considered significant. Assuming that at least one interfering signal is so identified, the server processes the samples to isolate a data set associated with the interfering signal. The server then proceeds to attempt to identify the same interfering signal within the collected data samples from at least two other receivers and isolate the associated data sets.

With at least three data sets collected from three different receivers, the server next performs a cross correlation of a pair of data sets in order to compute a time difference of arrival (TDOA) value which represents the time difference between when the interfering signal arrived at each of two different receivers. The cross correlation function is repeated for each unique pair of data sets.

In order to improve the accuracy of the location determination, the server processes the results of the cross correlations with a discriminator function. The discriminator function yields a significantly more precise computation of the TDOA, which results in greatly improved accuracy in determining the location of the jammer. Using the results of the discriminator function, the server computes a series of hyperbolic curves for each TDOA and, in turn, determines an intersection (or best fit) of such curves which represents the location of the jammer accurate to within a few meters.

BRIEF DESCRIPTION OF THE DRAWINGS

The invention description below refers to the accompanying drawings, of which.

DETAILED DESCRIPTION OF AN ILLUSTRATIVE EMBODIMENT

Figure 1:
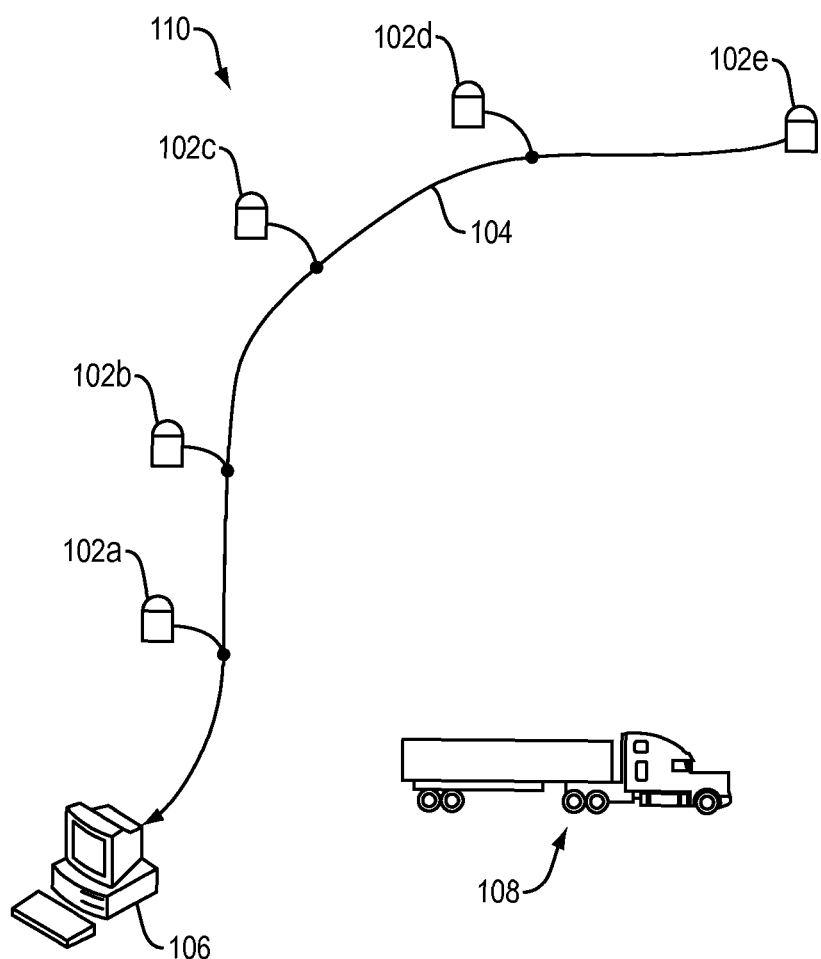
FIG. 1 is a schematic diagram of an environment in which a GNSS jammer, whose location is initially unknown, is present along with a system for determining the location of the jammer in accordance with the invention.

FIG. 1 shows an environment 100 in which augmented GNSS receivers 102a-102e are located at fixed, known locations that are separated by a minimum distance on the order of 100 meters. Augmented GNSS receivers 102a-102e are substantially similar in construction, the details of which are described below in connection with FIG. 2. Augmented GNSS receivers 102a-102e are connected by a network 104 to a server 106. Network 104 may represent a local area network, either wired or wireless, which is capable of supporting the data transfers and other activities described herein. It should be understood that other communication links could be substituted for or used in conjunction with network 104.

Server 106 may be implemented as, for example, a commercially available personal computer (PC), notebook or other computing device which has sufficient CPU, memory, mass storage and other resources to perform the data processing operations described herein. Alternatively, multiple servers (not shown) may be used to distribute the data processing load and improve performance.

Augmented GNSS receivers 102a-102e, network 104 and server 106 together form a system 110 for determining the location of an interfering signal source. An interfering signal source 108, whose location is initially unknown, is present in environment 100 and is transmitting one or more signals which interfere with the normal operations of augmented GNSS receivers 102a-102e. Interfering signal source 108 may represent, for example, a truck driver operating a handheld GNSS jammer.

Figure 2:
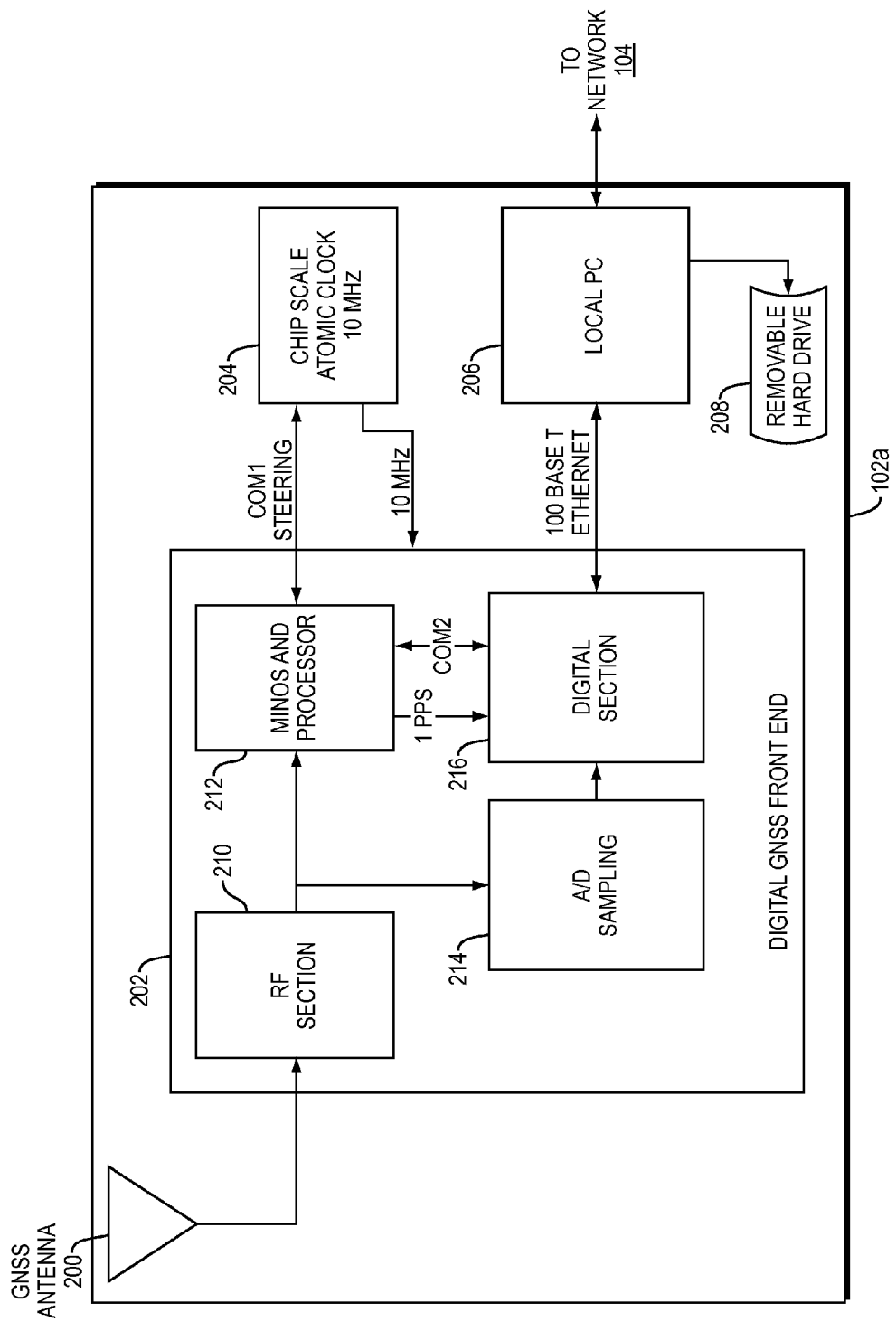
FIG. 2 is a block diagram of a representative one of the augmented GNSS receivers shown in FIG. 1.

FIG. 2 is a block diagram of augmented GNSS receiver 102a which is representative of receivers 102a-102e. A GNSS antenna 200 is coupled to a digital GNSS front end 202. A chip scale atomic clock 204 is coupled to front end 202 and functions as a highly accurate local clock for augmented GNSS receiver 102a. Alternatively, a local clock could be based upon GNSS time, generated by a temperature compensated crystal oscillator, obtained from local signals of opportunity (e.g., broadcast AM or FM radio or television signals, or geo-stationary communications satellites) or transmitted over network 104.

A local PC 206 is coupled to front end 202 and a removable hard drive 208, and includes a network interface card (not shown) or other interface to network 104. Front end 202 includes an RF section 210, a Multiple Independent Nomadic Stargazer (MINOS) and processor section 212, an analog to digital (A/D) sampling section 214, and a digital section 216. Alternatively, augmented GNSS receiver 102a may be constructed without local PC 206 or removable hard drive 208 provided that sufficient random access memory (RAM) and appropriate network connectivity are provided, thereby enabling data samples collected by receiver 102a to be stored and forwarded to server 106.

GNSS antenna 200 may be implemented with a GPS-702-GG GNSS antenna available from NovAtel Inc. of Calgary, Alberta. GNSS front end 202 may be implemented with a Digital GNSS Front End (DGFE) also available from NovAtel Inc. Chip scale atomic clock 204 may be implemented with a Symmetricom Chip Scale Atomic Clock. Local PC 206 and removable hard drive 208 may be implemented with an Intel® Atom™ based PC board with a 1 TB removable hard drive, respectively. MINOS and processor section 212 may be implemented with an OEMV1DF also available from NovAtel Inc.

In general, augmented GNSS receiver 102a is capable of receiving signals in the GNSS bands including potentially interfering signals. Specifically, signals received by GNSS antenna 200, including L1 and L2, are passed to RF section 210 where they are filtered and downconverted to IF. The filtered and downconverted signals are then passed to A/D sampling section 214 which generates I/Q data samples at a rate preferably on the order of at least approximately 2.5 megasamples per second. Alternatively, higher sampling rates, up to at least approximately 20 to 30 megasamples per second, may be used provided that augmented GNSS receiver 102a is adequately provisioned to either store locally or store and forward the collected samples.

At a sampling rate of 5 megasamples per second, the time between successive samples is 200 ns or a distance equivalent of approximately 60 meters, which is not sufficiently precise for most applications. However, as described in detail below in connection with FIG. 4, an interpolation technique based on a discriminator function may be used to improve accuracy to a few meters in the final position determination.

The data samples are time-tagged by digital section 216 with the current time (e.g., the time indicated by chip scale atomic clock 204) of augmented GNSS receiver 102a. The time-tagged data samples may be stored by local PC 206 on removable hard drive 208 along with the phase and pseudorange for the GNSS satellites, and the position and clock offset information for augmented GNSS receiver 102a. The time-tagged data samples and related information are subsequently packetized for transmission over network 104 to server 106.

The above-described process of receiving signals, generating time-tagged samples and forwarding those samples to server 106 is carried out in parallel in each of augmented GNSS receivers 102a-102e (FIG. 1). Thus, in the event that an interfering signal appears and is within the bandwidth of front end 202, it is likely that multiple ones (if not all) of augmented GNSS receivers 102a-102e will receive the interfering signal, generate time-tagged samples associated with that signal and forward those samples to server 106. So long as at least three augmented GNSS receivers 102a-102e received the interfering signal and generated time-tagged samples, there should be sufficient information available to determine the location of the interfering signal source.

Figure 3A:
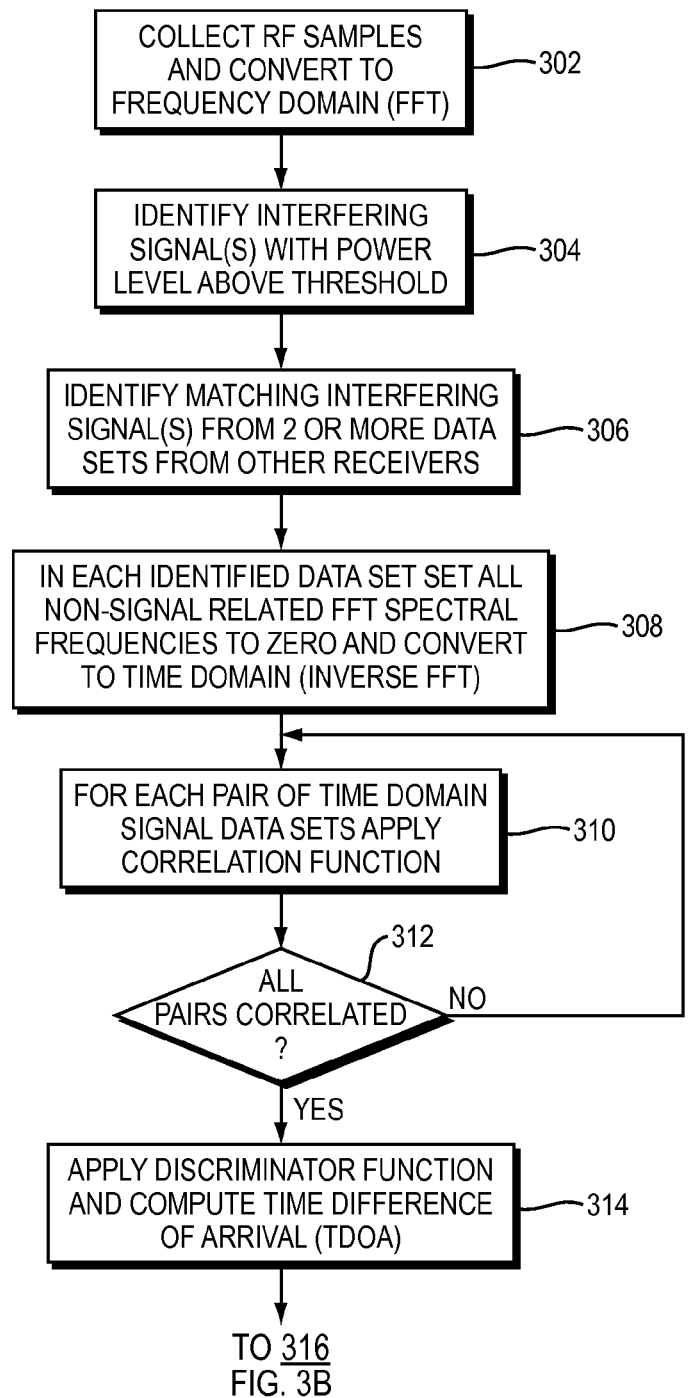
FIGS. 3A and 3B are a flowchart illustrating a method for determining the location of a GNSS jammer in conjunction with the system of FIG. 1.
Figure 3B:
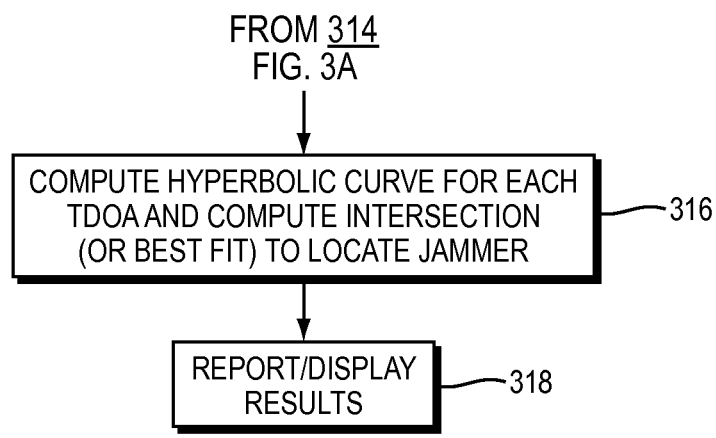

FIGS. 3A and 3B are a flowchart illustrating a method of determining the location of a GNSS jammer using the time-tagged samples generated by augmented GNSS receivers 102a-102e described above. The method shown in FIGS. 3A and 3B may be implemented entirely on server 106 or distributed across multiple servers.

The method begins at step 302 with the collection of time-tagged RF samples from each of augmented GNSS receivers 102a-102e and conversion of those samples to the frequency domain by way of a fast Fourier transform (FFT) function. Next, at step 304, the converted samples from a given one of receivers 102a-102e are analyzed in an effort to identify an interfering signal (or signals) having a power level above a threshold of interest. In general, an interfering signal would be expected to have a power level significantly higher than those of GNSS signals of interest. Further, if more than one interfering signal is present, each such signal will likely have at least one characteristic which will permit unique identification. For example, an interfering signal may have a unique frequency signature, power spike, signal transients, harmonics, angle of arrival at a given augmented GNSS receiver 102a-102e, or other characteristics.

Assuming that at least one interfering signal is identified at step 304, the method then continues to step 306 where converted samples associated with the interfering signal are located among the samples originating from at least two other augmented GNSS receivers 102a-102e, thereby creating a total of at least three data sets associated with the interfering signal.

Next, at step 308, for each of the at least three data sets associated with the interfering signal, all non-signal related FFT spectral frequencies are set to zero and the data sets are converted back to the time domain using an inverse FFT function. At step 310, by using the clock offset information previously received from augmented GNSS receivers 102a-102e as well as the time-tags, server 106 is able to perform a cross-correlation function with an initial pair of the (time domain) data sets which represent simultaneous observations by two augmented GNSS receivers 102a-102e. Through step 312, this processing is continued iteratively until all unique pairs of data sets have been cross-correlated.

At step 314, the cross-correlation for each pair of data sets is examined for the peak correlation value. As described in detail below in connection with FIG. 4, using the peak correlation value along with correlation values just prior to (early) and just after (late) the peak value, a discriminator function is used to compute a time difference of arrival (TDOA) with respect to each pair of data sets (corresponding to a pair of augmented GNSS receivers 102a-102e). The computed TDOA represents the difference in time between when the interfering signal arrived at the two augmented GNSS receivers associated with the data sets. The discriminator function advantageously serves to significantly improve the accuracy of the computed TDOA and, in turn, the accuracy of the location determination of the GNSS jammer.

If the ratio of a correlation's peak value over the average correlation is above a specified tolerance, the computed TDOA may be corrected for the difference in each augmented GNSS receiver's clock offset.

Figure 5:
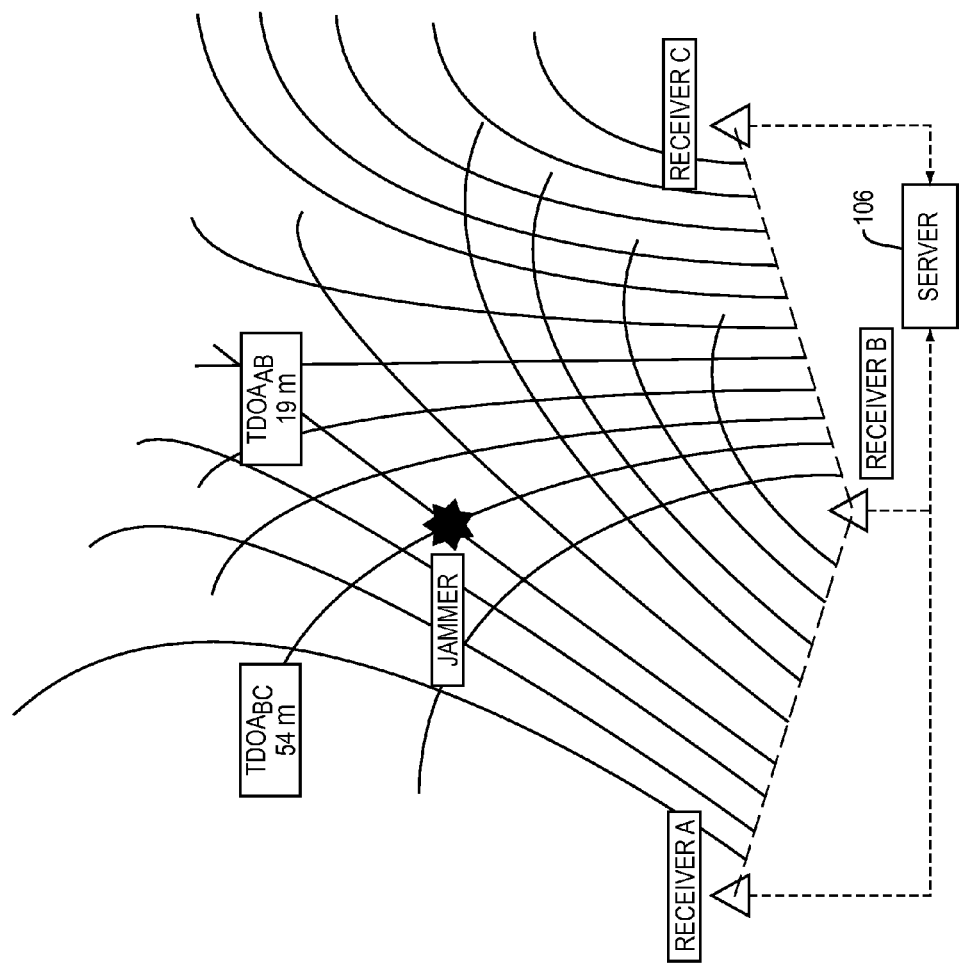
FIG. 5 graphically illustrates the computed hyperbolic curves used to determine the location of a GNSS jammer.

Once a TDOA is computed for each unique pair of data sets, the method continues to step 316 at which hyperbolic curves are computed for each TDOA according to the following equation:

$$TDOA_{iAB} = \frac{\sqrt{(x_i - x_A)^2 + (y_i - y_A)^2} - \sqrt{(x_i - x_B)^2 + (y_i - y_A)^2}}{C}$$

where $(x_i, y_i)$ is the unknown location of the GNSS jammer
  $(x_A, Y_A)$ is the known location of augmented GNSS receiver A
  $(x_B, Y_B)$ is the known location of augmented GNSS receiver B
  $TDOA_{iAB}$ is the time difference of arrival of the interfering signal at augmented GNSS receiver A and augmented GNSS receiver B
  C is the speed of light Results of the jammer location determination are reported or displayed (or both) at step 318. For example, in FIG. 5, results of the computation of the hyperbolic curves are plotted to illustrate the location of a GNSS jammer. The jammer's location is determined to be the intersection of two curves corresponding to $TDOA_{AB}$ (representing the TDOA between augmented GNSS receivers A and B), $TDOA_{BC}$ (representing the TDOA between augmented GNSS receivers B and C) and $TDOA_{AC}$ (representing the TDOA between augmented GNSS receivers A and C).

The method of least squares is typically used to solve for the unknown location of a GNSS jammer $(x_i, y_i)$ using a linearization of the TDOA equations for each combination of augmented GNSS receivers (AB, BC, AC). If the TDOAs computed using more than three augmented GNSS receivers are used in the least squares computation, the root mean squared of the residuals may be computed and compared against a tolerance to determine if the computed position is acceptable. Thus, the overall process of determining the location of a GNSS jammer $(x_i, y_i)$ may be summarized as follows:

1. Solve for the TDOA using cross correlation and a discriminator function.
2. The TDOA equation is a hyperbolic line equation that can be written with TDOA as a function of the known augmented GNSS receiver coordinates and the unknown GNSS jammer coordinates. In least squares terms: l=f(x), where l=observations(TDOA) and x are the unknowns (GNSS jammer coordinates).
3. Linearize the TDOA function using Ax+w=l, where A is the design matrix formed by A=df/dx . . . derivative of TDOA equation with respect to the unknowns and w is the misclosure matrix (TDOA−TDOA'), where TDOA' is computed using approximate coordinates $(x_0)$ for the GNSS jammer.
4. Using the least squares process solve for the corrections to x by:

$$\Delta = (A^T Cl A)^{-1} A^T Cl\, w$$

where $C_l$ is the covariance matrix of the observations.
  $x = x_0 + \Delta$, where $x_0$ are the approximate coordinates of the GNSS jammer.
5. Since the TDOA equation is non-linear, iterate steps 3 and 4. After updating x in step 4, reform A and w with the new approximate coordinates and then solve for Δ again, continuing until Δ (the corrections to the unknowns) falls below a certain tolerance (e.g., 1 mm).

Figure 4:
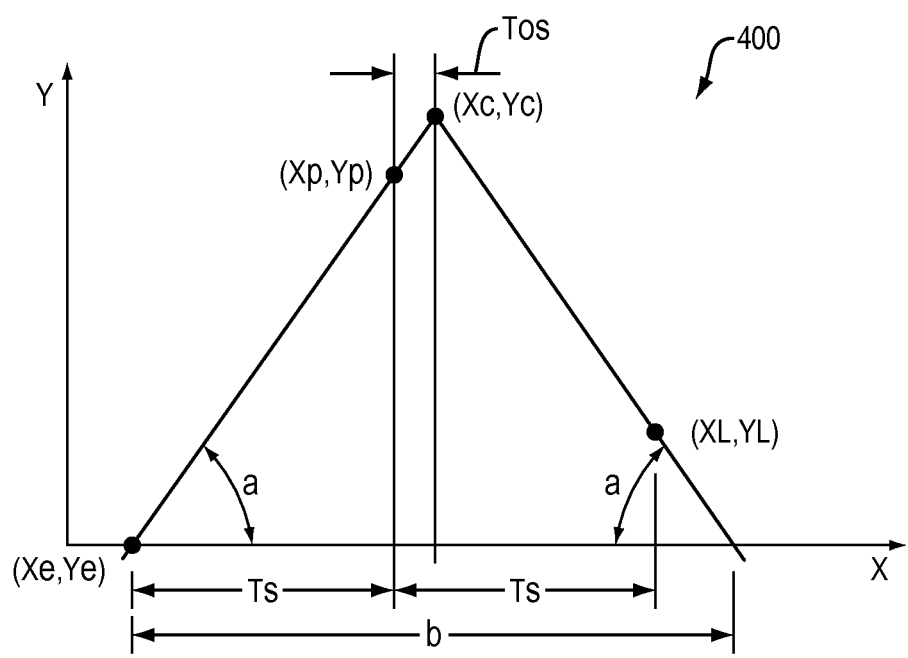
FIG. 4 illustrates a method of using early, punctual and late correlation data and a discriminator function to improve the accuracy of determining the location of a GNSS jammer.

FIG. 4 shows a correlation peak 400 resulting from the cross-correlation function performed in step 310 of FIG. 3A. Because an interfering signal from a GNSS jammer is wideband and resembles a pulse or chirp, the cross-correlation of data samples from different augmented GNSS receivers relating to such a signal will produce a symmetrical correlation peak similar to peak 400. That is, the expected actual correlation peak for the interfering signal will be at the apex of a symmetrical triangle containing the early, punctual and late correlation points (corresponding to the correlator values on three consecutive samples). It should be understood that if more than one interfering signal is present the correlation peak may not be symmetrical or two peaks may be present.

As shown FIG. 4, $(X_e, Y_e)$ represents the early correlation point, $(X_p, Y_p)$ represents a punctual correlation point, and $(X_L, Y_L)$ represents a late correlation point. The actual correlation peak is represented by (Xc,Yc). $T_{os}$ represents a time offset between the punctual and actual peak correlation points. $T_s$ represents the time interval between successive samples. At a sampling rate of 5 megasamples per second, $T_s = 1/5$ MHz=200 ns. Given the correlation values of $Y_e$, $Y_p$ and $Y_L$ along with $T_s$, the actual correlation peak may be solved for as follows.

For the case where $Y_e$ is less than $Y_L$, the value of $T_{os}$ may be computed using the equation:

$$T_{os} = \frac{T_s(Y_L - Y_e)}{2(Y_p - Y_e)}$$

For the case where $Y_e$ is greater than $Y_L$, the value of $T_{os}$ may be computed using the equation:

$$T_{os} = \frac{T_s(Y_L - Y_e)}{2(Y_p - Y_L)}$$

Through the use of the discriminator function described above, accuracy in the determination of a jammer's location may be improved from on the order of +/−60 meters to +/−3 meters.

If a jammer or other source of an interfering signal is moving, there will be an apparent Doppler shift of its frequency observed by augmented GNSS receivers 102a-102e (FIG. 1) The magnitude of the Doppler shift will depend upon the relative speed of the interfering signal source with respect to the location of each receiver. For example, if the interfering signal source is moving towards a particular receiver, there would be a corresponding positive Doppler shift and the apparent frequency of the interfering signal would increase. Conversely, if the interfering signal source is moving away from a particular receiver, there would be a negative Doppler shift and the apparent frequency would decrease. Assuming that augmented GNSS receivers 102a-102e are located randomly within environment 100, a relative direction of travel with respect to each such receiver would be different from the other receivers, thereby producing unique Doppler shifts observable at each receiver. Absent knowledge of the exact frequency of an interfering signal, Doppler differences between neighboring receivers could be used to determine a location of the interfering signal source.

The foregoing description has been directed to particular embodiments of this invention. It will be apparent, however, that other variations and modifications may be made to the described embodiments, with the attainment of some or all of their advantages. Also, the procedures, processes and/or modules described herein may be implemented in hardware, software, embodied as a computer-readable medium having program instructions, firmware, or a combination thereof.

What is claimed is:

1. A system for determining a location of an interfering signal source, the system comprising:
    a server connected in communicating relationship to at least three augmented global navigation satellite system (GNSS) receivers, each of said augmented GNSS receivers located at a known location;
    each of said augmented GNSS receivers including a GNSS antenna, a digital GNSS front end, a local clock, and a processor;
    each of said augmented GNSS receivers configured to sample GNSS signals and at least one interfering signal, time-tag each sample with a time of receipt produced by the local clock, and transmit each time-tagged sample to said server; and
    said server configured to identify particular time-tagged samples associated with said at least one interfering signal within the time-tagged samples received from each of said augmented GNSS receivers, cross-correlate the identified particular time-tagged samples for each pair of augmented GNSS receivers to produce correlation results, apply a discriminator function to the correlation results to compute a time difference of arrival for the each pair of augmented GNSS receivers, and compute the location of the interfering signal source based on the computed time difference of arrival for the each pair of augmented GNSS receivers.

2. The system of claim 1 wherein each of said augmented GNSS receivers samples said GNSS signals and said at least one interfering signal at a rate of at least approximately 2.5 megasamples per second.

3. The system of claim 1 wherein said local clock comprises a chip scale atomic clock.

4. The system of claim 1 wherein said server is further configured to convert said time-tagged samples into converted samples using a fast Fourier transform function (FFT).

5. The system of claim 4 wherein said server is further configured to identify a first data set including said converted samples originating from one of said augmented GNSS receivers and associated with said at least one interfering signal by comparing a power level of one or more of said converted samples to a threshold.

6. The system of claim 5 wherein said server is further configured to identify a total of at least three data sets each of which includes said converted samples originating from one of said augmented GNSS receivers and associated with said at least one interfering signal.

7. The system of claim 6 wherein said server is further configured to, with respect to each of said at least three data sets, set all non-signal related FFT spectral frequencies to zero and convert to a time domain using an inverse FFT function.

8. The system of claim 1 wherein said server is further configured to compute an apparent Doppler shift in the time-tagged samples received from each of said augmented GNSS receivers and associated with said at least one interfering signal.

9. The system of claim 8 wherein said server is further configured to compute differences in apparent Doppler shifts with respect to neighboring augmented GNSS receivers and to use such differences to compute the location of the interfering signal source.

10. A method for determining a location of an interfering signal source, the method comprising:
    collecting samples of global navigation satellite system (GNSS) signals and at least one interfering signal at each of at least three augmented GNSS receivers located at known locations, wherein each of the at least three augmented GNSS receivers including a GNSS antenna, a digital GNSS front end, a local clock, and a GNSS processor;
    time-tagging, at each of the at least three augmented GNSS receivers and based on the local clock, each of said samples with a time of receipt to produce time-tagged samples;
    receiving, at a server having a server processor and a server memory, the time-tagged samples from the at least three augmented GNSS receivers;
    identifying, by the server processor, particular time-tagged samples associated with said at least one interfering signal within the time-tagged samples received from the at least three augmented GNSS receiver;
    cross-correlating the identified particular time-tagged samples for each pair of augmented GNSS receivers to produce correlation results;
    applying a discriminator function to the correlation results to compute a time difference of arrival for the each pair of augmented GNSS receivers; and
    computing the location of the interfering signal source based on the computed time difference of arrival for the each pair of augmented GNSS receivers.

11. The method of claim 10 wherein each of said augmented GNSS receivers samples said GNSS signals and said at least one interfering signal at a rate of at least approximately 2.5 megasamples per second.

12. The method of claim 10 wherein said time of receipt is generated by a chip scale atomic clock.

13. The method of claim 10 wherein said time-tagged samples are converted to a frequency domain using a fast Fourier transform function (FFT).

14. The method of claim 13 wherein a first data set, including said converted samples associated with said at least one interfering signal, is identified from said converted samples originating from one of said augmented GNSS receivers by comparing a power level of one or more of said converted samples to a threshold.

15. The method of claim 14 wherein a total of at least three data sets each of which includes said converted samples associated with said at least one interfering signal and originating from one of said augmented GNSS receivers.

16. The method of claim 15 wherein, with respect to each of said at least three data sets, all non-signal related FFT spectral frequencies are set to zero and said data sets converted to a time domain using an inverse FFT function.

17. A method for determining a location of an interfering signal source, the system comprising:
    at each of at least three augmented global navigation satellite system (GNSS) receivers located at known locations, collecting samples of GNSS signals and at least one interfering signal, wherein each of said augmented GNSS receivers includes a GNSS antenna, a digital GNSS front end, a local clock, and a processor;

time-tagging each of said samples with a time of receipt to produce time-tagged samples;

receiving, at a server having a server processor and a server memory, the time-tagged samples;

identifying, by the server processor, particular time-tagged samples associated with said at least one interfering signal within the time-tagged samples received from each of said augmented GNSS receivers;

computing an apparent Doppler shift for said identified particular time-tagged samples for each of said augmented GNSS receivers; and computing differences in apparent Doppler shifts with respect to neighboring augmented GNSS receivers and using such differences to compute the location of the interfering signal source.

18. A server, comprising:
a processor and a memory, the processor configured to:
receive time-tagged samples from at least three augmented global navigation satellite system (GNSS) receivers located at known locations that each receive, at an antenna, GNSS satellite signals and at least one interfering signal, identify particular time-tagged samples associated with said at least one interfering signal within the time-tagged samples received from the at least three augmented GNSS receiver, cross-correlate the identified particular time-tagged samples for each pair of augmented GNSS receivers to produce correlation results;

applying a discriminator function to the correlation results to compute a time difference of arrival for each pair of augmented GNSS receivers, and compute a location of a source of said interfering signal based on the computed time difference of arrival for the each pair of augmented GNSS receivers.

19. The server of claim 18, wherein the processor is further configured to convert said time-tagged samples to converted samples using a fast Fourier transform function (FFT).

20. The server of claim 18, wherein the processor is further configured to identify a first data set including said converted samples originating from one of said augmented GNSS receivers and associated with said at least one interfering signal by comparing a power level of one or more of said converted samples to a threshold.

* * * * *

UNITED STATES PATENT AND TRADEMARK OFFICE
CERTIFICATE OF CORRECTION

| | | |
|---|---|---|
| PATENT NO. | : 9,766,343 B2 | Page 1 of 1 |
| APPLICATION NO. | : 14/309104 | |
| DATED | : September 19, 2017 | |
| INVENTOR(S) | : John B. Schleppe et al. | |

It is certified that error appears in the above-identified patent and that said Letters Patent is hereby corrected as shown below:

In the Specification

Column 6, Lines 9-10 delete:
new approximate coordinates and then solve for A again,
continuing until A (the corrections to the unknowns) falls
Insert:
--new approximate coordinates and then solve for $\Delta$ again,
continuing until $\Delta$ (the corrections to the unknowns) falls--

Signed and Sealed this
Twenty-fifth Day of June, 2019

Andrei Iancu
*Director of the United States Patent and Trademark Office*